United States Patent
Chen et al.

(10) Patent No.: US 11,016,120 B2
(45) Date of Patent: May 25, 2021

(54) SHARPENING METHOD FOR PROBE TIP OF ATOMIC FORCE MICROSCOPE (AFM)

(71) Applicant: Yanshan University, Qinhuangdao (CN)

(72) Inventors: Jianchao Chen, Qinhuangdao (CN);
Jingxin Wu, Qinhuangdao (CN);
Xiaoguang An, Qinhuangdao (CN);
Guangming Song, Qinhuangdao (CN)

(73) Assignee: YANSHAN UNIVERSITY

( * ) Notice: Subject to any disclaimer, the term of this patent is extended or adjusted under 35 U.S.C. 154(b) by 0 days.

(21) Appl. No.: 17/038,269

(22) Filed: Sep. 30, 2020

(65) Prior Publication Data
US 2021/0096153 A1 Apr. 1, 2021

(30) Foreign Application Priority Data
Sep. 30, 2019 (CN) .......................... 201910940906.4

(51) Int. Cl.
| | |
|---|---|
| *G01Q 60/38* | (2010.01) |
| *G01Q 60/16* | (2010.01) |
| *G01Q 70/14* | (2010.01) |
| *G01Q 70/16* | (2010.01) |
| *G01Q 60/32* | (2010.01) |
| *G01Q 60/34* | (2010.01) |
| *G01Q 70/00* | (2010.01) |

(52) U.S. Cl.
CPC ............. *G01Q 60/38* (2013.01); *G01Q 60/16* (2013.01); *G01Q 70/14* (2013.01); *G01Q 70/16* (2013.01); *G01Q 60/32* (2013.01); *G01Q 60/34* (2013.01); *G01Q 70/00* (2013.01)

(58) Field of Classification Search
CPC ........ G01Q 60/38; G01Q 60/16; G01Q 60/32; G01Q 70/00; G01Q 70/14; G01Q 70/16
USPC ........ 850/21, 33, 37, 38, 40, 52, 53, 54, 56, 850/59, 60
See application file for complete search history.

(56) References Cited

U.S. PATENT DOCUMENTS

| | | | | |
|---|---|---|---|---|
| 2009/0304772 | A1* | 12/2009 | Choubey | ................. C23F 1/28 424/423 |
| 2013/0204245 | A1* | 8/2013 | Ivanisevic | .............. A61B 18/00 606/41 |

* cited by examiner

*Primary Examiner* — Nicole M Ippolito
(74) *Attorney, Agent, or Firm* — Mark T. Vogelbacker; Eckert Seamans Cherin & Mellott LLC

(57) ABSTRACT

A sharpening method for a probe tip of an Atomic Force Microscope (AFM) includes the steps of dripping a prepared slurry on a glass slide to form a droplet on the glass slide, where particles of the prepared slurry are diamond powder; infiltrating the tip to be sharpened with the prepared slurry; setting operation mode of the AFM to tapping in the fluid and lowering the probe into droplet till the probe cantilever beam is immersed completely in the droplet; setting vibration parameters, scanning parameters, and sharpening time, performing tip sharpening; and evaluating the sharpening results, and finishing sharpening. When the AFM works in a tapping mode in fluid, the tip of the self-excited oscillating probe is sharpened under the grinding effect of the diamond particles. The method is simple and effective, and easy to implement.

12 Claims, 3 Drawing Sheets

SHARPENING METHOD FOR PROBE TIP OF ATOMIC FORCE MICROSCOPE (AFM)

CROSS REFERENCE TO RELATED APPLICATION

This application claims the priority of Chinese Patent Application No. 201910940906.4 entitled "Sharpening Method For Probe Tip Of Atomic Force Microscope (AFM)" filed with the Chinese Patent Office on Sep. 30, 2019, which is incorporated herein by reference in its entirety.

TECHNICAL FIELD

The disclosure relates to the technical field of precision engineering, in particular to a sharpening method for the tip of a probe of an atomic force microscope.

BACKGROUND

Atomic force microscopes (short for AFM) are widely applied to atomic-scale research of chemical, biological and engineering materials since its inception to provide great opportunities for development of nanoscience. Atomic force microscopy imaging is essentially that when the surface of a sample is scanned by a probe, the tip of the probe comes into contact with the sample surface to produce images which include not only surface morphology information of the sample but also geometric information of the tip of the probe due to tip-sample convolution effect. Therefore, the AFM image quality of a specific sample varies with changes of the probe tip size. Likewise, the tip size can also affect mechanical characterization result when performing nano-indentation using AFM. Furthermore, owing to the interaction force between the tip and surface, the tip that is quite expensive inevitably tends to wear. The curvature radius of the worn tip is enlarged, even the tip of the probe could be broken due to abnormal operations. Therefore, a simple and effective sharpening method for the AFM probe tip is needed to reuse the worn tips with the purpose to lower the AFM imaging cost.

SUMMARY

In order to overcome defects existing in the background, the disclosure provides a simple and effective sharpening method for a probe tip of an AFM.

To achieve the above objective, the disclosure provides the following solutions:

A sharpening method for a probe tip of an atomic force microscope (AFM) includes: dropping a prepared slurry on a glass slide mounted on a sample stage of the AFM to form a droplet on the glass slide, wherein particles in the prepared slurry are diamond powder;

infiltrating the tip to be sharpened with the prepared slurry;

setting operation mode of the AFM to be tapping mode in fluid, and lowering the probe into the slurry droplet till the cantilever beam of the probe where tip is mounted is immersed completely in the droplet;

setting vibration parameters, scanning parameters, and sharpening time, and performing tip sharpening; and evaluating the tip sharpening quality, and finishing sharpening.

Optionally, the particles of the prepared slurry are diamond powder with a diameter of 15 nm-25 nm, solvents of the prepared slurry are deionized water, and the concentration of the prepared slurry is 0.5 vol. conc %.

Optionally, the step of dropping a prepared slurry on a glass slide on a sample stage of the AFM to form a droplet on the glass slide specifically includes:

firstly placing the glass slide as a sample on the sample stage of the AFM, then uniformly stirring the prepared slurry with a glass rod, and dropping the uniformly stirred slurry in a center of the glass slide by a syringe, wherein the dripped slurry volume is 1 mL-2 mL.

Optionally, the step of infiltrating the tip to be sharpened with the prepared slurry specifically includes:

firstly, mounting the probe to be sharpened on a fluid cell cantilever holder in the slurry, and then mounting the holder on the AFM scanner, then dripping the prepared slurry on the tip with the syringe, wherein the dripped slurry volume is 1 mL-2 mL.

Optionally, the step of setting vibration parameters, scanning parameters, and sharpening time, and performing tip sharpening specifically includes:

firstly setting the vibration parameters and the sharpening time, and then setting scanning parameters of the probe; regulating a distance between the tip to be sharpened and the surface of the glass slide by moving the Z direction AFM scanner stage, so that the distance between the tip to be sharpened and the surface of the glass slide is between 200 nm and 500 nm after an engage command of the AFM is sent; setting a scanning range to be 0; enabling the probe to be sharpened to be in a self-excited oscillating state; and starting to sharpen the tip.

Optionally, a vibration frequency is 12 KHz, and a vibration amplitude is 100 nm.

Optionally, the sharpening time is 5 min.

Optionally, the step of evaluating the sharpened tip specifically includes:

collecting morphology images of the tip before and after sharpening with a scanning electron microscope; and comparing the tip SEM images before and after tip sharpening, and if the curvature radius of the sharpened tip is smaller than that of the tip before sharpening, confirming that the tip sharpening process is effective According to specific implementation of the disclosure, the following technical effects are disclosed.

According to the sharpening method for an AFM probe tip provided by the disclosure, when the AFM works in a tapping mode in fluid, the tip of the self-excited oscillating probe is sharpened under the grinding effect of the diamond particles. The method is simple and effective, and easy to implement.

BRIEF DESCRIPTION OF THE DRAWINGS

To describe the technical solutions in the examples of the disclosure or in the prior art more clearly, the following briefly describes the accompanying drawings required for the examples. Apparently, the accompanying drawings described below show merely some examples of the disclosure, and a person of ordinary skilled in the art may still derive other accompanying drawings from these accompanying drawings without creative efforts.

DETAILED DESCRIPTION

The following clearly and completely describes technical solutions in examples of the disclosure with reference to accompanying drawings in the examples of the disclosure. Apparently, the described examples are merely a part rather than all of the examples of the disclosure. All other examples obtained by a person of ordinary skilled in the art based on the examples of the disclosure without creative efforts shall fall within the protection scope of the disclosure.

In order to make the above objectives, features and advantages of the disclosure more understandable, the disclosure will be described in further details below with reference to the accompanying drawings and detailed examples.

Figure 1:
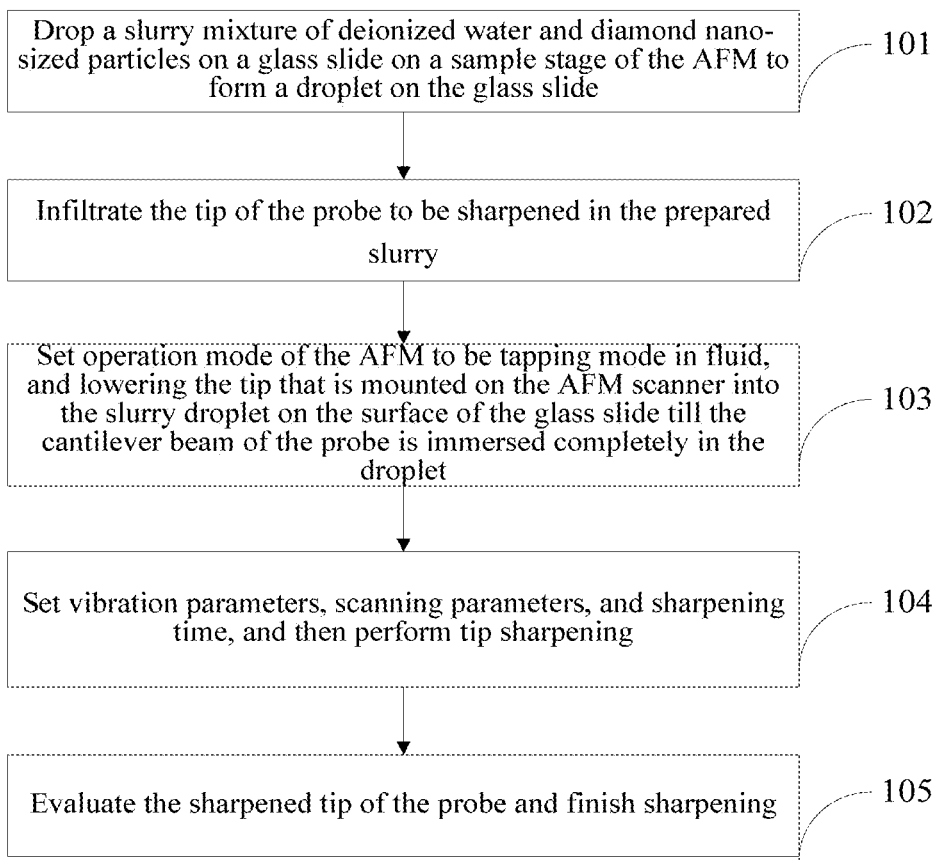
FIG. 1 is a flow chart of the AFM tip sharpening method

The disclosure provides a sharpening method for a probe tip of an AFM. When the AFM works in the mode of tapping in fluid, the tip of the self-excited oscillating probe is sharpened around the V-shaped grinding trajectory of the diamond particles, and specific implementation steps are shown as FIG. 1, including:

Step 101: drop a slurry mixture of deionized water and diamond nano-sized particles on a glass slide on a sample stage of the AFM to form a droplet on the glass slide, where the particles are diamond powder with a diameter of 15 nm-25 nm, the concentration of the prepared slurry is 0.5 vol. conc %.

Before implementation of Step 101, firstly place the glass slide as a sample on the sample stage of the AFM, and then uniformly stir the prepared slurry with a glass rod.

In the embodiment, the uniformly stirred slurry is dropped in a center of the glass slide by a syringe, and the drop volume is 1 mL-2 mL.

Figure 2:
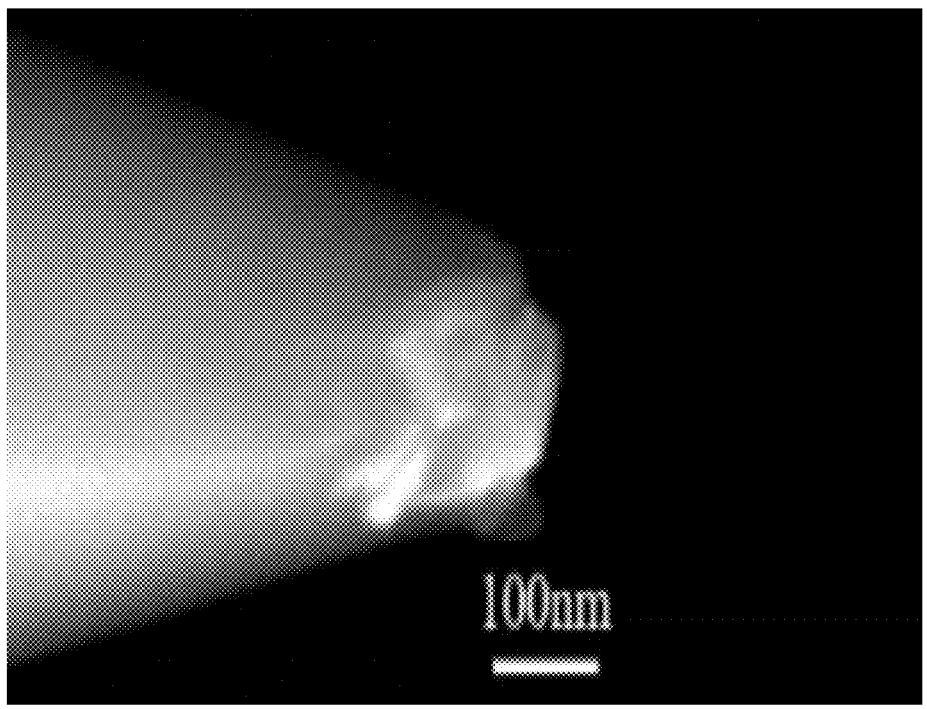
FIG. 2 is a schematic diagram of the morphology image of a tip before sharpening captured by a scanning electron microscope in the embodiments of the disclosure.

Step 102: infiltrate the tip to be sharpened in the prepared slurry: including specific operations:

firstly, mounting the probe to be sharpened on a fluid cell cantilever holder, and then mounting the holder on the AFM scanner, and then dripping the slurry properly prepared and uniformly stirred at the tip with a syringe, where the slurry drop volume is 1 mL-2 mL, to prevent generating bubbles around the tip after the probe is immersed in the slurry droplet, since the bubbles may result in the failure of an experiment; where the schematic diagram of the tip to be sharpened under the scanning electron microscope is shown as in FIG. 2.

Step 103: set operation mode of the AFM to be tapping mode in fluid, and lowering the tip that is mounted on the AFM scanner into the slurry droplet on the surface of the glass slide till the cantilever beam of the probe is immersed completely in the droplet.

Step 104: set vibration parameters, scanning parameters, and sharpening time, and perform tip sharpening.

In the embodiment, vibration parameters include vibration frequency and amplitude, where the vibration frequency is 12 KHz, and the amplitude is 100 nm.

In the embodiment, the sharpening time is 5 min.

Step 104 includes the operation processes of firstly setting the vibration parameters and scanning parameters of the probe, and then setting the sharpening time; regulating a distance between the tip to be sharpened and the surface of the glass slide by moving the Z direction AFM scanner sample stage, so that the distance between the tip to be sharpened and the surface of the glass slide is between 200 nm and 500 nm after an engage command of the AFM is sent (the probe is inserted), and setting a scanning range to be 0; enabling the probe to be in a self-excited oscillating state; and starting to sharpen the tip.

Acoustic waves are transmitted in fluid, two eddy currents in opposite vortex directions are formed in both right and left side of the tip under sharpening, and the diamond particles are driven by the eddy currents to move, so that the tip of probe is sharpened around the V-shaped grinding trajectory.

Step 105: evaluate the sharpened tip of the probe and finish sharpening.

Figure 3:
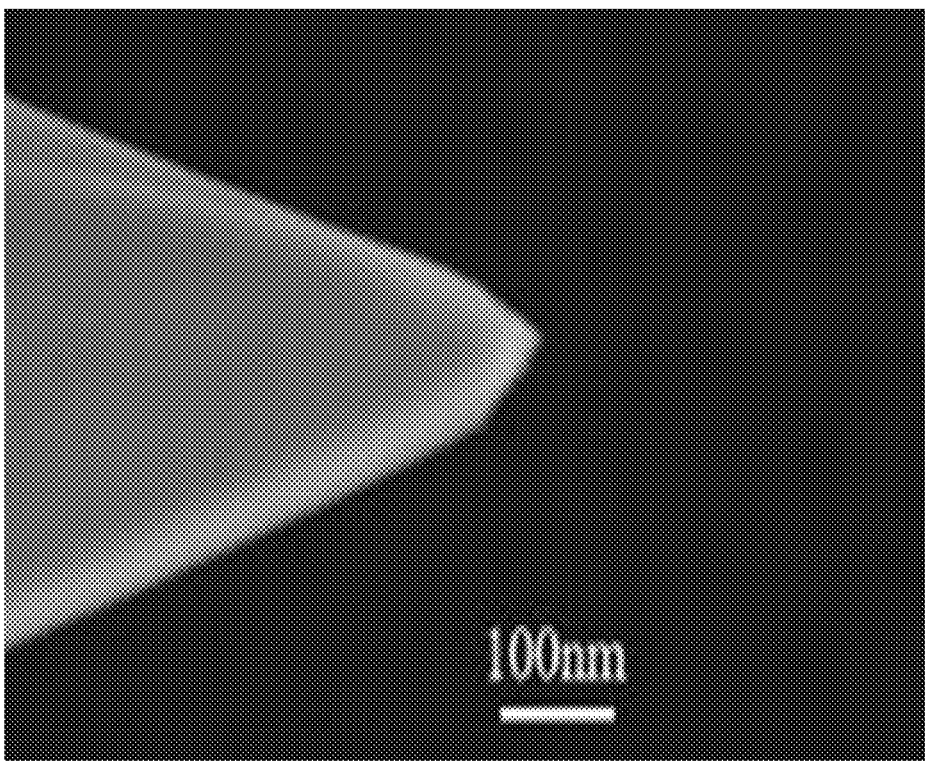
FIG. 3 is a schematic diagram of the morphology image of the tip after sharpening captured by a scanning electron microscope in the embodiments of the disclosure.

The sharpened tip is observed with the scanning electron microscope (SEM), comparing the tip SEM images before and after tip sharpening, and if the curvature radius of the sharpened tip is smaller than that of the tip before sharpening, confirming that the tip sharpening process is effective. As shown in FIG. 2 (before sharpening) and FIG. 3 (after sharpening), it can be observed that the curvature radius is decreased obviously. The sharpening process can be continued till the requirements are met.

Figure 4:
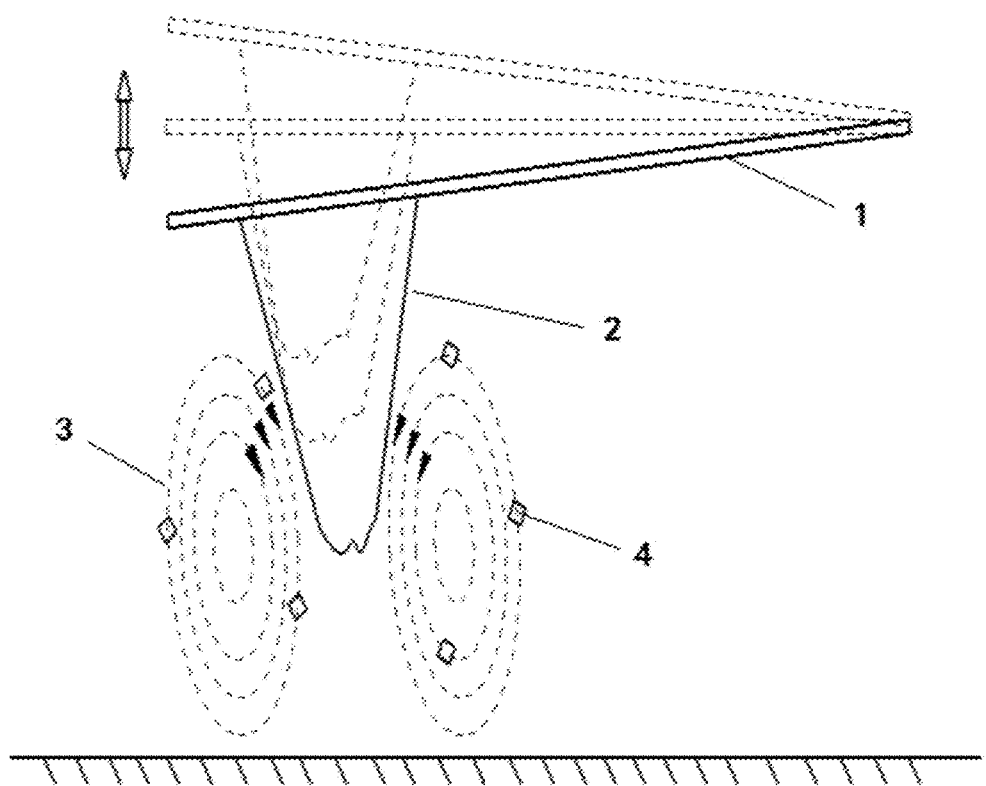
FIG. 4 is a schematic diagram of interaction between the AFM tip and diamond particles suspended in the aqueous slurry in the embodiments of the disclosure.

According to the disclosure, the probe tip is sharpened around the V-shaped grinding trajectory of the diamond particles in the slurry, and the sharpening process is as shown in FIG. 4; 1—probe cantilever beam, 2—the tip of the probe, 3—eddy current formed in the slurry, and 4—diamond particles suspended in the slurry.

Several examples are used herein for illustration of the principles and examples of the disclosure. The description of the examples is used to assist in understanding the method and its core principles of the disclosure. In addition, a person of ordinary skilled in the art can make various modifications in terms of specific examples and scope of application in accordance with the teachings of the disclosure. In conclusion, the content of the description shall not be construed as a limitation to the disclosure.

What is claimed is:

1. A sharpening method for a probe tip of an atomic force microscope (AFM), comprising:
    dropping a prepared slurry on a glass slide mounted on a sample stage of the AFM to form a droplet on the glass slide, wherein particles in the prepared slurry are diamond powder;
    infiltrating the tip to be sharpened with the prepared slurry;
    setting operation mode of the AFM to be tapping mode in fluid, and lowering the probe tip into the slurry droplet till the cantilever beam of the probe where tip is mounted is immersed completely in the droplet;
    setting vibration parameters, scanning parameters, and sharpening time, and performing tip sharpening; and evaluating the tip sharpening quality, and finishing sharpening,
    wherein the step of setting vibration parameters, scanning parameters, and sharpening time, and performing tip sharpening comprises:
    firstly setting the vibration parameters and the sharpening time, and then setting scanning parameters of the probe; regulating a distance between the tip to be sharpened and the surface of the glass slide by moving the Z direction AFM scanner stage, so that the distance between the tip to be sharpened and the surface of the glass slide is between 200 nm and 500 nm after an engage command of the AFM is sent; setting a scanning range to be 0; enabling the probe to be sharpened to be in a self-excited oscillating state; and starting to sharpen the tip.

2. The sharpening method for a probe tip of an AFM according to claim 1, wherein the particles of the prepared slurry are diamond powder with a diameter of 15 nm-25 nm, solvents of the prepared slurry are deionized water, and the concentration of the prepared slurry is 0.5 vol. conc %.

3. The sharpening method for a probe tip of an AFM according to claim 1, wherein the step of dropping a prepared slurry on a glass slide on a sample stage of the AFM to form a droplet on the glass slide specifically comprises:
firstly placing the glass slide as a sample on the sample stage of the AFM, then uniformly stirring the prepared slurry with a glass rod, and dropping the uniformly stirred slurry in a center of the glass slide by a syringe, wherein the dripped slurry volume is 1 mL-2 mL.

4. The sharpening method for a probe tip of an AFM according to claim 1, wherein the step of infiltrating the tip to be sharpened with the prepared slurry specifically comprises:
firstly, mounting the probe to be sharpened on a fluid cell cantilever holder in the slurry, and then mounting the holder on the AFM scanner, then dripping the prepared slurry on the tip with the syringe, wherein the dripped slurry volume is 1 mL-2 mL.

5. The sharpening method for a probe tip of an AFM according to claim 1, wherein a vibration frequency is 12 KHz, and a vibration amplitude is 100 nm.

6. The sharpening method for a probe tip of an AFM according to claim 1, wherein the sharpening time is 5 min.

7. The sharpening method for a probe tip of an AFM according to claim 1, wherein the step of evaluating the sharpened tip specifically comprises:
collecting morphology images of the tip before and after sharpening with a scanning electron microscope; and
comparing the tip SEM images before and after tip sharpening, and if the curvature radius of the sharpened tip is smaller than that of the tip before sharpening, confirming that the tip sharpening process is effective.

8. A sharpening method for a tip of a probe of an atomic force microscope (AFM), the method comprising:
dropping a slurry mixture including diamond particles on a slide on a sample stage of the AFM to form a droplet on the slide;
mounting the probe onto a cantilever holder and mounting the cantilever holder on the AFM;
setting an operating mode of the AFM to tapping mode; and
lowering the tip into the droplet on the glass slide,
wherein the tip is sharpened around a V-shaped grinding trajectory of the diamond particles.

9. The sharpening method according to claim 8, wherein the diamond particles are diamond powder with a diameter of 15 nm-25 nm, solvents of the slurry mixture are deionized water, and concentration of the slurry mixture is 0.5 vol. conc %.

10. The sharpening method according to claim 8, wherein the method further comprises setting vibration parameters of the AFM, wherein the vibration parameters include vibration frequency and vibration amplitude, wherein the vibration frequency is 12 KHz and the vibration amplitude is 100 nm.

11. The sharpening method according to claim 8, wherein the tip is sharpened for 5 min.

12. The sharpening method according to claim 8, further comprising:
collecting morphology images of the tip before and after sharpening with a scanning electron microscope (SEM); and
comparing the SEM images before and after tip sharpening.

* * * * *